United States Patent
Bian et al.

(10) Patent No.: US 9,172,875 B2
(45) Date of Patent: Oct. 27, 2015

(54) VIDEO PROCESSING METHOD AND ELECTRONIC DEVICE

(71) Applicant: ArcSoft Hangzhou Co., Ltd., Hangzhou (CN)

(72) Inventors: Qiao-Ling Bian, Hangzhou (CN); Yan-Qing Lu, Hangzhou (CN); Yu-Shan Huang, Hangzhou (CN); Jin Wang, Hangzhou (CN)

(73) Assignee: ARCSOFT HANGZHOU CO., LTD., Hangzhou (CN)

( * ) Notice: Subject to any disclaimer, the term of this patent is extended or adjusted under 35 U.S.C. 154(b) by 495 days.

(21) Appl. No.: 13/651,030

(22) Filed: Oct. 12, 2012

(65) Prior Publication Data

US 2014/0105304 A1   Apr. 17, 2014

(51) Int. Cl.
*H04N 7/32* (2006.01)
*H04N 5/232* (2006.01)
*H04N 5/262* (2006.01)

(52) U.S. Cl.
CPC ....... *H04N 5/23254* (2013.01); *H04N 5/23267* (2013.01); *H04N 5/2621* (2013.01)

(58) Field of Classification Search
USPC ......................................................... 375/240
See application file for complete search history.

(56) References Cited

U.S. PATENT DOCUMENTS

| | | | | |
|---|---|---|---|---|
| 8,995,531 | B2 * | 3/2015 | Cui et al. | 375/240.16 |
| 2002/0167523 | A1 * | 11/2002 | Taylor et al. | 345/582 |
| 2003/0142107 | A1 * | 7/2003 | Taylor et al. | 345/582 |
| 2008/0060034 | A1 * | 3/2008 | Egnal et al. | 725/105 |
| 2008/0186404 | A1 * | 8/2008 | Bull et al. | 348/616 |
| 2009/0256918 | A1 * | 10/2009 | Rabinowitz et al. | 348/208.4 |
| 2011/0176014 | A1 * | 7/2011 | Hong et al. | 348/208.4 |
| 2011/0311137 | A1 * | 12/2011 | Liu et al. | 382/173 |
| 2012/0275521 | A1 * | 11/2012 | Cui et al. | 375/240.16 |

* cited by examiner

*Primary Examiner* — Christopher S Kelley
*Assistant Examiner* — Asmamaw G Tarko
(74) *Attorney, Agent, or Firm* — Muncy, Geissler, Olds & Lowe, P.C.

(57) ABSTRACT

A video processing method includes the steps of: inputting a video; matching multiple frames of the video according to corresponding positions, wherein one of the frames serves as a reference image; marking a motion region, to be preserved, in the video; and submerging a content of each of the frames, corresponding to the motion region, into the reference image to generate a replacement frame. An electronic device is also disclosed.

11 Claims, 4 Drawing Sheets

VIDEO PROCESSING METHOD AND ELECTRONIC DEVICE

BACKGROUND OF THE INVENTION

1. Field of Invention

The invention relates to a video processing method and an electronic device.

2. Related Art

With the advancement of technology, the method of using the technological product to preserve the memory also changes with the evolution of the times. For example, the earliest method of using an optical camera to photograph the photos gradually changes to the method of using the older digital camera to record the moment and now to the method of using the quite popular digital camera, camera mobile phone, smart mobile phone or tablet computer with the video recording function. So, people can not only take photos, but also package the motion memory by way of video recording.

Although the moment recorded by the photo is beautiful, the pity is that the photo cannot be as lifelike as the video. According to another point of view, the video is lifelike, but the photographer's shaking tends to deteriorate the video quality and lack aesthetics. Therefore, if the advantages of both of them can be combined, the memory can be preserved or shared with friends by way of motion photos, so that the user has the better user experience.

SUMMARY OF THE INVENTION

In view of the foregoing, an objective of the invention is to provide a video processing method and an electronic device having the advantages of the aesthetic feeling of the still photo and the lifelike motion video.

To achieve the above objective, the present invention discloses a video processing method comprising the steps of: inputting a video; matching multiple frames of the video according to corresponding positions, wherein one of the frames serves as a reference image; marking a motion region, to be preserved, in the video; and submerging a content of each of the frames, corresponding to the motion region, into the reference image to generate a replacement frame.

In one embodiment, the video processing method further comprises a step of: integrating the replacement frames into a motion image file.

In one embodiment, a first frame of the frames of the video serves as the reference image.

In one embodiment, the step of matching the frames of the video according to the corresponding positions comprises: checking at least one characteristic corner in a first frame of the frames; calculating an error amount between the characteristic corner and each of corresponding candidate points in a second frame of the frames when one of the characteristic corners is checked; finding a minimum error from the error amounts; setting the characteristic corner and the corresponding candidate point, corresponding to the minimum error, as matching corners; calculating corner offsets on coordinate values of the matching corners in the first frame and the second frame; and calculating an overall offset according to the corner offsets.

In one embodiment, the step of submerging the content of each of the frames, corresponding to the motion region, into the reference image to generate the replacement frame comprises: finely tuning coordinates of the frames corresponding to the motion region according to the overall offsets, respectively; and submerging a content of each of the frames, corresponding to the motion region after fine tuning, into the reference image to generate the replacement frame.

In one embodiment, the characteristic corner is found using a Harris corner detection approach.

In one embodiment, the replacement frames have a common fixed background, and the replacement frames show motion pictures in the motion region.

To achieve the above objective, the present invention also discloses an electronic device, comprising a storage unit and a processing unit. The storage unit stores a video. The processing unit matches multiple frames of the video according to corresponding positions, marks a motion region, to be preserved, in the video with one of the frames serving as a reference image, and submerges contents of the frames, corresponding to the motion region, into the reference image to generate multiple replacement frames.

In one embodiment, the electronic device is a digital camera or a camera mobile phone.

In one embodiment, the processing unit integrates the replacement frames into a motion image file.

In one embodiment, a first frame of the frames of the video serves as the reference image.

In one embodiment, the processing unit matches the frames of the video according to the corresponding positions by the steps of: checking at least one characteristic corner in a first frame of the frames; calculating an error amount between the characteristic corner and each of corresponding candidate points in a second frame of the frames when one of the characteristic corners is checked; finding a minimum error from the error amounts; setting the characteristic corner and the corresponding candidate point, corresponding to the minimum error, as matching corners; calculating corner offsets on coordinate values of the matching corners in the first frame and the second frame; and calculating an overall offset according to the corner offsets.

In one embodiment, the processing unit submerges the content of each of the frames, corresponding to the motion region, into the reference image to generate the replacement frame by the steps of: finely tuning coordinates of the frames corresponding to the motion region according to the overall offsets, respectively; and submerging a content of each of the frames, corresponding to the motion region after fine tuning, into the reference image to generate the replacement frame.

In one embodiment, the characteristic corner is found using a Harris corner detection approach.

In one embodiment, the replacement frames have a common fixed background, and the replacement frames show motion pictures in the motion region.

As mentioned above, the video processing method and the electronic device of the invention have the advantages of the aesthetic feeling of the still photo and the lifelike motion video. In addition, the invention can be applied to various electronic devices, such as the personal computer, the digital camera, the camera mobile phone and the like, and the operation thereof is simple and convenient. The user can preserve the memory or share the memory with friends by motion photos through the invention, and thus obtain the better user experience.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
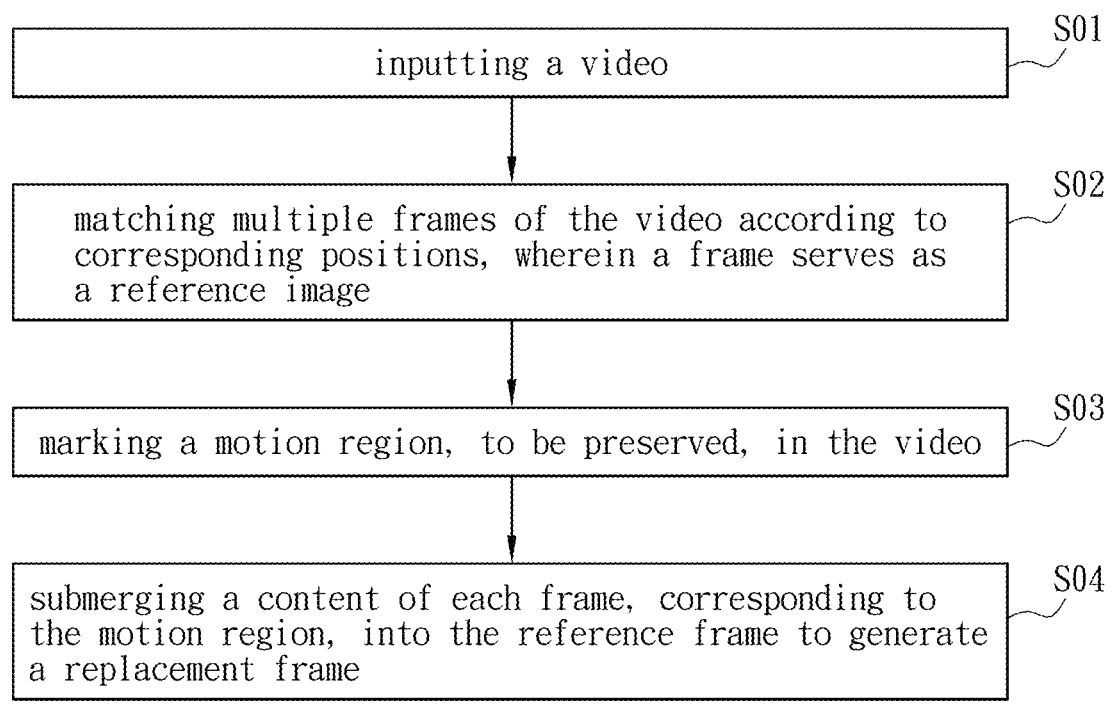
FIG. 1 is a flow chart showing a video processing method according to a preferred embodiment of the invention.

FIG. 1 is a flow chart showing a video processing method according to a preferred embodiment of the invention. The video processing method of the invention may be applied to various electronic devices, such as a portable electronic device including a digital camera, a camera mobile phone, a mobile phone, a tablet computer, a notebook computer or the like; or a non-portable electronic device including a personal computer, a digital photo frame or the like. Referring to FIG. 1, the video processing method includes steps S01 to S04.

In the step S01, a video is inputted. Specifically speaking, the video inputting may be implemented by using a video recording lens of the electronic device to directly photograph, or the video is stored in a storage unit of the electronic device, and the user calls the video from the storage unit through a call event. The storage unit may be a built-in element of the electronic device, such as an internal hard disk drive. Of course, the storage unit may also be an element, which is not built in the electronic device and is coupled to the electronic device in a wired or wireless manner. For example, the storage unit may be an external hard disk drive, a universal serial bus (USB) mobile disk, or each of various memory cards coupled to the electronic device in the wired manner. Alternatively, the storage unit may be a cloud hard disk drive or a wireless universal serial bus (WUSB) mobile disk coupled to the electronic device in the wireless manner.

In the step S02, multiple frames of the video are matched according to corresponding positions, wherein one of the frames serves as a reference image. Specifically speaking, the video is a set of multiple frames. In other words, the video may be regarded as a frame sequence formed by multiple continuous frames. The time interval between the times of acquiring the frames is extremely short (e.g., several milliseconds), so the frames have similar background images. In this step, one of the frames serves as the reference frame. For instance, a first frame of the video serves as the reference image, and the other (a portion or all) frames are matched according to the corresponding positions to find out the corresponding relationship with respect to the reference frame.

Figure 2:
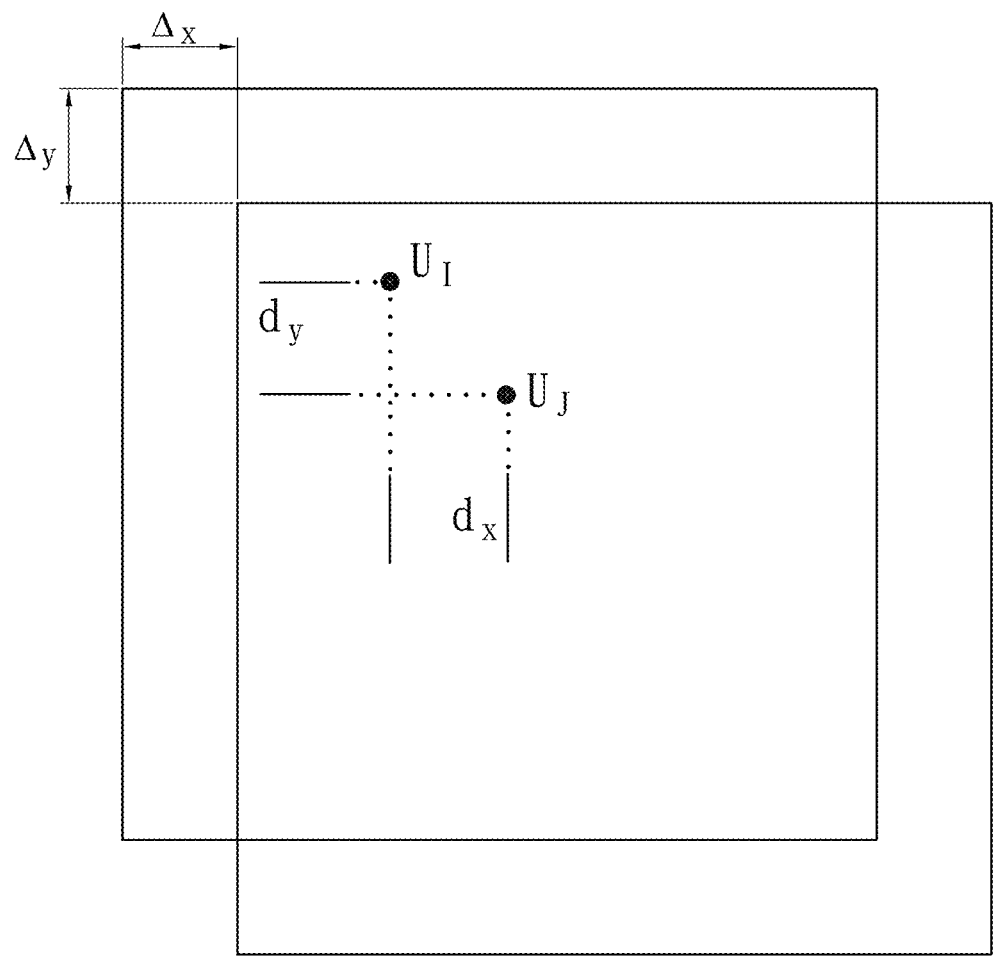
FIG. 2 is a schematic illustration showing multiple frames of a video matching according to corresponding positions.

Referring simultaneously to FIG. 2, multiple frames of the video are matched according to the corresponding positions, and the processes are described in the following.

First, at least one characteristic corner on the first frame is found according to the Harris corner detection approach having the operation principle of judging whether a pixel point is located in a plane, on an edge or at a corner based on the pixel point by checking the degrees of color level changes in all directions (e.g., up, down, left, right, upper right, upper left, lower right, lower left and the like) around the pixel point. Furthermore, the Harris corner detection approach calculates the color level changes of pixel points in one Gaussian window or rectangular window to judge whether there is a corner present in the window. Generally speaking, there are multiple characteristic corners found. After all characteristic corners in the first frame are found, they are checked one by one.

Next, when one of the characteristic corners is checked, an individual error amount between the characteristic corner and each of corresponding candidate points in the second frame is calculated. Referring simultaneously to FIG. 2, one of the characteristic corners will be described as an example. A coordinate point $(x_I, y_I)$ corresponding to the characteristic corner $u_I = (x_I, y_I)$ in the second frame is offset with different offsets to form multiple corresponding candidate points. Next, a match box around the characteristic corner $u_I$ is opened, and match boxes, which have the same size and are disposed around the corresponding candidate points, are also opened. The content differences between the match box around the characteristic corner $u_I$ and the match boxes around the corresponding candidate points are calculated one by one, so that an error amount between the characteristic corner $u_I$ and each of the corresponding candidate points in the second frame is obtained. The characteristic corner or each of the corresponding candidate points may be located inside the match box, on the edge of the match box or at the corner of the match box. Furthermore, the error amount may be defined as follows:

$$E(d_x, d_y) = \sum_{x=x_I-w_x}^{x_I+w_x} \sum_{y=y_I-w_y}^{y_I+w_y} (I(x, y) - J(x + d_x, y + d_y))^2$$

where $d_x$ and $d_y$ are x-axis and y-axis offset components, respectively, $w_x$ and $w_y$ are x-axis and y-axis dimensions of the match box, respectively, $I(x,y)$ and $J(x,y)$ represent the content functions of the first frame and the second frame at the coordinate point $(x,y)$, respectively, and the content function may be represented by a color value or a gray scale value.

Then, a minimum error is found from the error amounts. The characteristic corner, corresponding to the minimum error, and the corresponding candidate point are set as matching corners. Specifically, the x-axis offset component and the y-axis offset component corresponding to the minimum error can be found according to the following equation:

$$(d_x, d_y) = \underset{d_x, d_y}{\mathrm{argmin}} E(d_x, d_y).$$

The smaller error amount represents the higher matching degree between the corresponding characteristic corner and the corresponding candidate point. So, the minimum error amount represents the highest matching degree between the corresponding characteristic corner and the corresponding candidate point. In other words, the characteristic corner and the corresponding candidate point can be paired by finding the minimum error from the error amounts, the corresponding candidate point corresponding to the specific characteristic corner can be found and set as the matching corner, and the corresponding candidate point is marked as $u_J = (x_J, y_J)$.

Finally, corner offsets are calculated according to the coordinate values of the matching corners in the first frame and the second frame. An overall offset is calculated according to the corner offsets. Specifically, when the first frame and the second frame are not necessarily completely the same, especially when the first frame is different and offset from the second frame, the two steps are to calculate the corner offsets between the corresponding matching corners (the characteristic corner and the corresponding candidate point). In this embodiment, the corner offsets are the x-axis offset component and the y-axis offset component between the characteristic corner and the corresponding candidate point corresponding to the characteristic corner. In addition, all the characteristic corners $u_f(x, y)$ in the first frame have the corresponding candidate points $u_j(x+d_x, y+d_y)$, serving as the matching corners, in the second frame, and the corresponding x-axis offset component $d_x$ and y-axis offset component $d_y$. Accordingly, the overall offset between the first frame and the second frame is calculated according to the corner offsets. For example, the overall offset may be divided into the x-axis overall offset and the y-axis overall offset. For the x-axis offset, the statistical averages of the x-axis and y-axis offset components can be calculated according to the following equations, respectively:

$$\Delta_x = \frac{1}{N}\sum_{i=1}^{N} d_{xi}, \Delta_y = \frac{1}{N}\sum_{i=1}^{N} d_{yi}.$$

Thus, the first frame and the second frame can be matched, where N represents the number of the matching corners.

As a result, the relationship between the second frame and the first frame may approximate $I(x, y) \approx J(x+\Delta_x, y+\Delta_y)$, where $I(x,y)$ and $J(x,y)$ represent the content functions of the first frame and the second frame, respectively, at the coordinate point $(x,y)$. The content function may represent the color value or the gray scale value of the point. That is, the content of the second frame at the coordinate point $(x+\Delta_x, x+\Delta_y)$ may approximate the content of the coordinate point $(x,y)$ of the first frame.

In the step S03, a motion region, to be preserved, is marked in the video. The user can mark the motion region, to be preserved in the video, through the input interface of the electronic device (e.g., the mouse, the keyboard, the touch screen or the like), and the motion region serves as the reference for the operation of the subsequent step S04.

In the step S04, the content of each frame corresponding to the motion region is submerged into the reference image to generate a replacement frame. Next, for the sake of understanding, the method regarding how the contents of the frames corresponding to the motion region are submerged into the reference image to generate the replacement frames will be further described in the following.

The coordinates of the frames corresponding to the motion region are finely tuned, respectively, according to the overall offset. For example, the x-axis coordinate of an arbitrary frame may approximate the x-axis coordinate of the reference frame plus the x-axis offset of the overall offset corresponding to the frame, and the y-axis coordinate of an arbitrary frame may approximate the y-axis coordinate of the reference frame plus the y-axis offset of the overall offset corresponding to the frame. Thus, the coordinate of the motion region can be finely tuned and thus matched with the motion region of the reference frame.

The content of each frame corresponding to the finely tuned motion region is submerged into the reference image to generate a replacement frame. Simply speaking, this step is to replace the image of the motion region of the reference frame with the image of the motion region of each frame, so that the replacement frames can be formed one by one. That is, the replacement frames have the common fixed background (i.e., the background of the reference frame). Preferably, the replacement frames show motion pictures in the motion region.

Nevertheless, the video processing method may further include the following step of integrating the replacement frames into a motion image file. Thus, the user can integrate the replacement frames, processed in this step, into a continuous image sequence serving as a motion image file stored in the storage unit of the electronic device. Of course, the user may also directly transfer the motion image file to the remote end through the network without directly storing the file into the storage unit of the electronic device. So, the invention is not particularly restricted thereto.

Figure 3A:
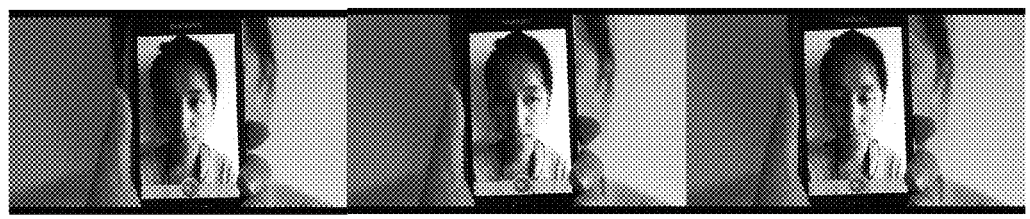
FIGS. 3A to 3C are schematic illustrations showing operations performed by the video processing method.
Figure 3B:
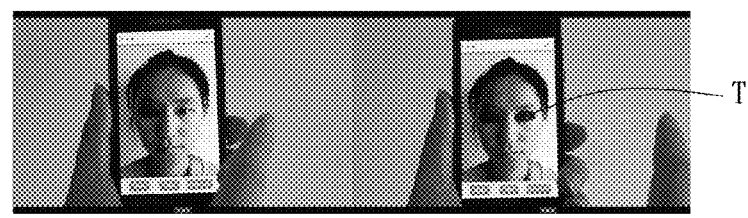
Figure 3C:
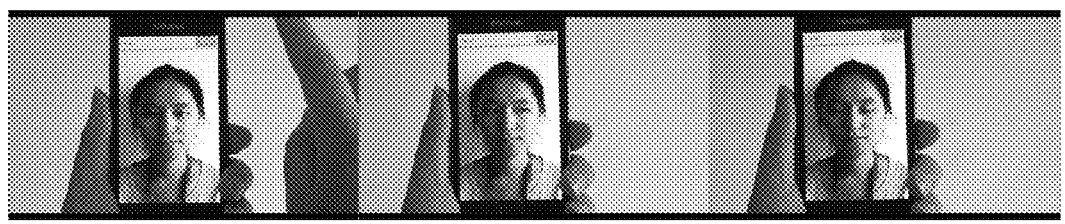

FIGS. 3A to 3C are schematic illustrations showing the practical operations. The practical operation will be described with an example mobile phone serving as the electronic device. However, it is to be specified that the applicable electronic device of the invention is not particularly restricted thereto.

As shown from the left picture to the right picture in FIG. 3A, the user photographs the rotating, opening and closing of the eyes of a character through the video recording lens of the mobile phone, so as to input a video. It is to be noted that the character positions in the left picture and the right picture are offset from each other.

Next, as shown in the left and right pictures of FIG. 3B, the user marks the eyes of the character in the video to serve as the motion region T to be preserved through the touch screen.

Finally, as shown from the left to right pictures in FIG. 3C, according to the motion image file, obtained after the video processing method of the invention, the eye portions are still kept in the forms of motions of rotating, opening and closing. As shown in the drawing, the original offset of the character has been eliminated. At this point, the user obtains a motion image file with the eye rotating, opening and closing without the offset character.

Figure 4:
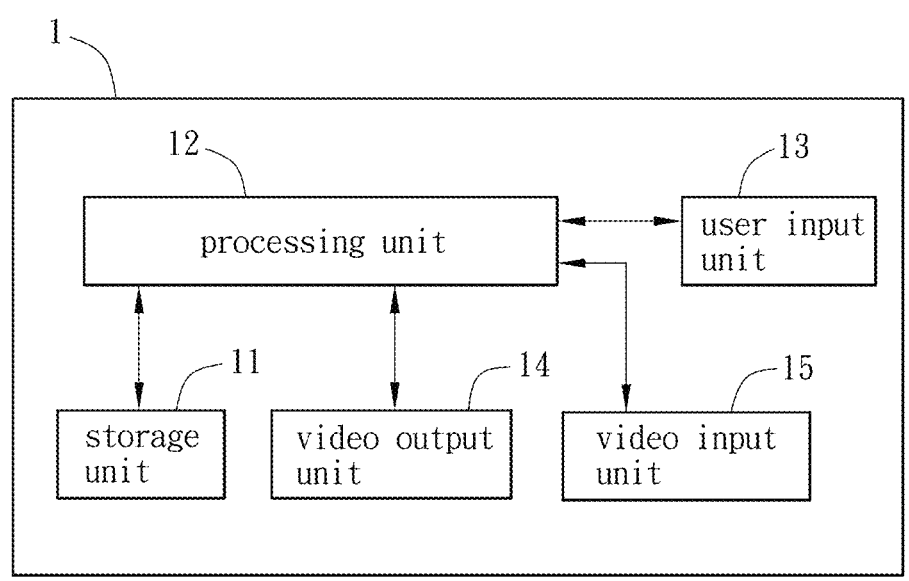
FIG. 4 is a block diagram showing an electronic device according to another preferred embodiment of the invention.

FIG. 4 is a block diagram showing an electronic device 1 according to another preferred embodiment of the invention. The electronic device 1 performs the video processing method and includes a storage unit 11, a processing unit 12, a user input unit 13, a video input unit 14 and a video output unit 15. The processing unit 12 is coupled to the storage unit 11, the user input unit 13, the video input unit 14 and the video output unit 15.

The storage unit 11 is, for example, a volatile memory, a non-volatile memory, or a combination of the volatile and non-volatile memories. The processing unit 12 is an operation element, such as a processor, a microcontroller or the like, for executing the instruction sets. The user input unit 13 is, for example, a touch panel, a keyboard or a mouse. The video input unit 14 is, for example, a camera module. The video output unit 15 is, for example, a display panel.

The storage unit 11 stores a video, which may be inputted by the video input unit 14. The processing unit 12 matches multiple frames of the video according to the corresponding positions, wherein one of the frames serves as a reference image. The processing unit 12 also marks a motion region, to be preserved, in the video and submerges the content of each frame, corresponding to the motion region, into the reference image to generate a replacement frame.

The processing unit 12 matches the frames of the video according to the corresponding positions and the technological characteristic, which has be mentioned hereinabove and will not be described again.

Next, the processing unit 12 marks a motion region, to be preserved, in the video according to the user's input through the user input unit 13, and submerges the content of each frame, corresponding to the motion region, into the reference image so that multiple replacement frames are generated, and the finished result is outputted. Of course, the processing unit 12 may also integrate the replacement frames into a motion image file and store the motion image file into the storage unit 11, wherein the motion image file may be played in the video output unit 15. The technological characteristic regarding how the content of each frame corresponding to the motion region is submerged into the reference image to generate the replacement frames has been described hereinabove and will be omitted herein.

In addition, the data and program codes for processing the video may also be stored in the storage unit 11 for the processing unit 12 to perform the execution and computation. The data and these program codes may be, for example, the data and program codes required by the processing unit 12 to perform the processing operations in the embodiment of the FIGS. 1 to 3. For example, each step in FIG. 1 may be implemented by a program code, which may be stored in the storage unit 11 and executed by the processing unit 12. Because the details of processing the video in this embodiment are similar to those of the embodiment of FIGS. 1 and 2, detailed descriptions thereof will be omitted.

In summary, the video processing method and the electronic device of the invention have the advantages of the aesthetic feeling of the still photo and the lifelike motion video. In addition, the invention can be applied to various electronic devices, such as the personal computer, the digital camera, the camera mobile phone and the like, and the operation thereof is simple and convenient. The user can preserve the memory or share the memory with friends by motion photos through the invention, and thus obtain the better user experience.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A video processing method, comprising the steps of:
    inputting a video;
    matching multiple frames of the video according to corresponding positions, wherein one of the frames serves as a reference image, wherein the step of matching the frames of the video according to the corresponding positions comprises:
        checking at least one characteristic corner in a first frame of the frames;
        calculating an error amount between the characteristic corner and each of corresponding candidate points in a second frame of the frames when one of the characteristic corners is checked;
        finding a minimum error from the error amounts;
        setting the characteristic corner and the corresponding candidate point, corresponding to the minimum error, as matching corners;
        calculating corner offsets on coordinate values of the matching corners in the first frame and the second frame; and
        calculating an overall offset according to the corner offsets;
    marking a motion region, to be preserved, in the video; and
    submerging a content of each of the frames, corresponding to the motion region, into the reference image to generate a replacement frame, wherein the step of submerging the content of each of the frames, corresponding to the motion region, into the reference image to generate the replacement frame comprises:
        finely tuning coordinates of the frames corresponding to the motion region according to the overall offsets, respectively; and
        submerging a content of each of the frames, corresponding to the motion region after fine tuning, into the reference image to generate the replacement frame.

2. The video processing method according to claim 1, further comprising:
    integrating the replacement frames into a motion image file.

3. The video processing method according to claim 1, wherein a first frame of the frames of the video serves as the reference image.

4. The video processing method according to claim 1, wherein the characteristic corner is found using a Harris corner detection approach.

5. The video processing method according to claim 1, wherein the replacement frames have a common fixed background, and the replacement frames show motion pictures in the motion region.

6. An electronic device, comprising:
    a storage unit storing a video; and
    a processing unit, which matches multiple frames of the video according to corresponding positions, marks a motion region, to be preserved, in the video with one of the frames serving as a reference image, and submerges contents of the frames, corresponding to the motion region, into the reference image to generate multiple replacement frames,
    wherein the processing unit matches the frames of the video according to the corresponding positions by the steps of:
        checking at least one characteristic corner in a first frame of the frames;
        calculating an error amount between the characteristic corner and each of corresponding candidate points in a second frame of the frames when one of the characteristic corners is checked;
        finding a minimum error from the error amounts;
        setting the characteristic corner and the corresponding candidate point, corresponding to the minimum error, as matching corners;
        calculating corner offsets on coordinate values of the matching corners in the first frame and the second frame; and
        calculating an overall offset according to the corner offsets,
    wherein the processing unit submerges the content of each of the frames, corresponding to the motion region, into the reference image to generate the replacement frame by the steps of:
        finely tuning coordinates of the frames corresponding to the motion region according to the overall offsets, respectively; and
        submerging a content of each of the frames, corresponding to the motion region after fine tuning, into the reference image to generate the replacement frame.

7. The electronic device according to claim 6, wherein the electronic device is a digital camera or a camera mobile phone.

8. The electronic device according to claim 6, wherein the processing unit integrates the replacement frames into a motion image file.

9. The electronic device according to claim 6, wherein a first frame of the frames of the video serves as the reference image.

10. The electronic device according to claim 6, wherein the characteristic corner is found using a Harris corner detection approach.

11. The electronic device according to claim 6, wherein the replacement frames have a common fixed background, and the replacement frames show motion pictures in the motion region.

* * * * *